United States Patent
Sagan (10) Patent No.: US 6,672,495 B2
(45) Date of Patent: Jan. 6, 2004

(54) BIFURCATED CARRIER PACK FOR TRANSPORTING RECREATIONAL EQUIPMENT

(76) Inventor: David W. Sagan, 379 Meadow La., Palatine, IL (US) 60067

( * ) Notice: Subject to any disclaimer, the term of this patent is extended or adjusted under 35 U.S.C. 154(b) by 199 days.

(21) Appl. No.: 10/005,051

(22) Filed: Dec. 7, 2001

(65) Prior Publication Data

US 2003/0106920 A1 Jun. 12, 2003

(51) Int. Cl.7 ............... A45F 4/00; A45C 15/00; F42B 39/02
(52) U.S. Cl. ............ 224/579; 224/582; 224/586; 224/637; 224/638; 224/639; 224/651; 224/661; 224/917
(58) Field of Search ............... 224/576, 153, 224/578, 579, 581, 582, 586, 637, 638, 639, 640, 643, 650, 651, 653, 661, 917

(56) References Cited

U.S. PATENT DOCUMENTS

| | | | |
|---|---|---|---|
| 2,224,568 A | 12/1940 | Altorfer | |
| 2,530,695 A | 11/1950 | Helmert | |
| 3,920,166 A | 11/1975 | Hogensen, Jr. | |
| 4,515,300 A | 5/1985 | Cohen | |
| 4,518,107 A | 5/1985 | Amos | |
| 4,982,883 A | 1/1991 | Ullal et al. | |
| 5,096,103 A | 3/1992 | Baugh | |
| 5,129,560 A | * 7/1992 | Herman | 224/579 |
| 5,139,187 A | 8/1992 | Fowler | |
| 5,350,096 A | 9/1994 | Sieber | |
| 5,427,290 A | * 6/1995 | Thatcher | 224/148.2 |
| 5,450,991 A | 9/1995 | Neading | |
| 5,540,364 A | 7/1996 | Krieger et al. | |
| 5,647,522 A | * 7/1997 | Routh | 224/651 |
| 5,746,361 A | 5/1998 | Johnson | |
| 5,803,332 A | * 9/1998 | Thompson | 224/651 |
| 5,881,708 A | * 3/1999 | Kliot | 224/653 |
| 6,446,852 B1 | * 9/2002 | Sorensen et al. | 224/661 |
| 6,536,638 B1 | * 3/2003 | Gulmatico, III | 224/153 |

* cited by examiner

Primary Examiner—Stephen K. Cronin
(74) Attorney, Agent, or Firm—Christopher J. Scott; Charles F. Meroni, Jr.; Meroni & Meroni, P.C.

(57) ABSTRACT

The present invention discloses a bifurcated carrier pack for electively transporting snowboard equipment either in a traditional, back-mounted position or in an unconventional, hip-mounted position. A snowboard may be removably attached to the bifurcated pack while in a back-mounted position for transportation and detachment ease. When the user elects to remove the snowboard from the pack, the bifurcated pack may be easily configured to a hip-mounted position to shift the user's center of gravity from a superior center of gravity to an inferior center of gravity for improving the downhill snowboarding experience. The bifurcated pack comprises a pair of storage compartments, two shoulder straps and an abdominal encircling belt. At the election of the user, the storage compartments may be pivoted about their lower half to achieve either a back-mounted configuration or a hip-mounted configuration. The shoulder straps secure the storage compartments in place while in either configuration.

23 Claims, 8 Drawing Sheets

BIFURCATED CARRIER PACK FOR TRANSPORTING RECREATIONAL EQUIPMENT

BACKGROUND OF THE INVENTION

1. Field of the Invention

The present invention relates to a carrier pack for transporting snowboard equipment. More particularly, the present invention relates to a carrier pack for transporting a snowboard and accessory equipment, which carrier pack easily adjusts in carrier configuration when the snowboard is detached to shift the wearer's center of gravity for improving the downhill snowboarding experience.

2. Description of the Prior Art

Snow sports are extremely popular activities supporting a great number of industries. Noteworthy among these industries are those that provide the sundry specialized equipment for engaging in snow sport activities. Snow skiing and snowboarding, for example, are among the most popular of snow sports requiring specialized equipment. Snowboarding, in particular, at the very least, requires a snowboard, bindings, boots and clothing. In addition to the more essential equipment, snow sport enthusiasts also find useful the inclusion of various accessory items. In this regard, snowboarders often find useful the inclusion of maintenance kits, transceivers, shovels, security devices, and any number of personal items as peripheral components to the snowboarding experience.

The various types of equipment are often awkward and cumbersome to transport to and from the site of activity, however. Systems and devices for assisting snow sport enthusiasts in the transportation of snow sport equipment have thus become well developed and accordingly are well known in the prior art. For example, snow ski carrying systems, having multiple elective functions are known, some of which are described hereinafter.

U.S. Pat. No. 2,530,695 ('695 Patent), which issued to Helmert, discloses a Ski Carrier and Waist Belt. The Ski Carrier and Waist Belt teaches a strap which may be electively utilized for carrying skis comprising at each end thereof loop forming short straps with which a loop may be formed. The loops, after having been passed round a set of skis, are adjustably tightened so as to enable the user to transport one or more pairs of skis in a vertical position behind the user's shoulder. Moreover, the strap may further be electively utilized as a belt for the waist of the user by securing the loop forming straps in the lengthwise direction of the central strap part for securement about the user's waist. It is noteworthy that the Ski Carrier and Waist Belt of the '695 Patent does not disclose an electively convertible back-to-hip carrier pack having two separate storage compartments pivotable about a lower half.

U.S. Pat. No. 3,920,166 ('166 Patent), which issued to Hogensen, Jr., discloses a Ski-Carrier Strap Device. The Ski-Carrier Strap Device is also electively convertible from a waist belt to a ski-carrier and vice versa. The Ski Carrier Strap Device comprises a single strap, which is continuous in its length from one end to the other. A buckle member of mating buckle means is attached to one end of the strap and two length adjustment slides are attached to the strap for sliding positional adjustment along the length thereof. The other end of the strap is attached to the length adjustment slide nearest that end thereby forming a loop of adjustable size. A second buckle member of the mating buckle means is positioned with the other length adjustment slide and is adapted to releasably engage the buckle member on the first-mentioned end of the strap to form a second loop of adjustable size. A third buckle member is slidably attached to the portion of the strap that forms the first loop. The second loop is used to carry skis by forming and wrapping it about the skis while the first loop provides a handle to carry the bundle. Elective reconversion to the waist belt is made by unbuckling the second loop, adjusting the size of the first loop, and attaching the first-mentioned buckle member to the third buckle member. It is further noted that the Ski-Carrier Strap Device of the '166 Patent also does not disclose an electively convertible carrier pack having two separate storage compartments pivotable about an abdominal encircling belt enabling a user to convert the carrier pack between either a back-mounted position or a hip-mounted position.

U.S. Pat. No. 4,518,107 ('107 Patent), which issued to Amos, discloses a Carrier System for Ski Equipment. At the election of the user, the Carrier System for Ski Equipment may be converted to a waist belt when not being used as a carrier system. In one embodiment a belted pack is combined with a carrier into which pack the carrier may be placed when not in use. U.S. Pat. No. 5,350,096 ('096 Patent), which issued to Sieber, discloses another Ski Carrier that can quickly compact from a backpack into a carrying pouch for wear around the user's waist. U.S. Pat. No. 5,540,364 ('364 Patent), which issued to Krieger et al., discloses an Article Carrier. The Article Carrier may be electively modified into a fanny pack, a backpack carrier, and/or a carrier for skis and the like. The Article Carrier comprises a shoulder harness detachably secured to the fanny pack and may electively be stored in the pack compartment or draped over a user's shoulders. The '107 Patent, the '096 Patent and the '364 Patent further do not disclose a convertible carrier pack having two separate storage compartments pivotable about an abdominal encircling belt enabling a user to electively convert the carrier pack between either a back-mounted position or a hip-mounted position.

U.S. Pat. No. 5,450,991 ('991 Patent), which issued to Neading, discloses a Combination Storage Belt and Ski Carrier Accessory and Method of Conversion. The Combination Storage Belt and Ski Carrier Accessory and Method of Conversion comprises a belt mounting pair of releasably and reversibly attachable flexible members at each of a pair of opposite ends of the belt and a storage bag at an intermediate location thereon between the opposite ends of the belt. The belt is adjustable to convert it between a contracted condition and an expanded condition. In the contracted condition, the adjustable belt is adapted to be worn about the user's waist with the flexible members forming closed loops positioned on the same side of the belt as the storage bag. In the expanded condition the belt is adapted to be worn across the front of the user's torso and over one shoulder with the flexible members forming closed loops positioned on the opposite side of the belt from the storage bag to hold and carry skis in a generally upright orientation along the user's back. Connector members are connected during the contracted condition and disconnected during the expanded condition. It is still further noted that the '991 Patent does not disclose a pivotable, two-storage-compartment system, electively convertible while the user wears the system from a back-mounted position to a hip-mounted position enabling the user to shift the user's center of gravity from a superior center to an inferior center for improving the sport experience.

Systems and/or devices having multiple elective functions to assist snowboarders in the transportation of snowboard equipment are less known in the prior art. For example, U.S. Pat. No. 5,096,103 ('103 Patent), which issued to Baugh, discloses a Removable Snowboard Waist Pack. The Removable Snowboard Waist Pack comprises a pack for attachment to a snowboard by hook and loop fasteners. The pack further comprises front and top pouches and a carrying strap whereby the pack may be electively removed from the snowboard and worn about a user's waist. U.S. Pat. No. 5,746,361 ('361 Patent), which issued to Johnson, discloses a Carrier for Transporting Elongate Recreational Equipment. The Carrier for Transporting Elongate Recreational Equipment comprises a panel on which are mounted top and bottom securing straps and which are securing through top and bottom securing buckles on the opposite side of the panel. The securing straps for transport may then secure a snowboard. First and second carrying straps are mounted to the panel and connect at the unmounted ends to form a complete carrying strap. The user may insert an arm and head through the complete strap such that the complete strap extends across the user's torso and the panel with secured snowboard is adjacent the medial portion of the user's back. Neither the '103 Patent nor the '361 Patent discloses a back-mountable carrier pack having left and right storage compartments, which compartments easily pivot about an abdominal encircling belt to a hip-mounted position at the election of the user.

It will thus be seen that none of the prior art discloses a bifurcated carrier pack for electively transporting snowboard equipment either in a traditional rucksack, back-mounted position or in an unconventional hip-mounted position. Further, none of the prior art discloses a two-compartment system, which, at the election of the user, may shift the user's center of gravity from a superior center to an inferior center for improving the sport experience. Further none of the prior art disclose a two-compartment system, which compartments may, at the election of the user, be pivoted about an abdominal encircling belt while the user wears the carrier pack to convert from a traditional back-mounted position to a hip-mounted position.

SUMMARY OF THE INVENTION

Accordingly, an objective of the present invention is to provide a two-compartment system whereby a user may elect to transport stored equipment either in a traditional rucksack, back-mounted manner or in an unconventional, hip-mounted manner. A further objective of the present invention is to provide a bifurcated carrier pack for electively transporting snowboard or other equipment in a back-mounted position or in a hip-mounted position. Another objective of the present invention is to provide a two-compartment carrier pack system, which, at the election of the user, enables the user to shift his or her center of gravity from a superior center to an inferior center for improving the sport experience. Yet another objective of the present invention is to provide a two-compartment carrier pack system, wherein the compartments may electively pivot about an abdominal encircling belt while the user wears the carrier pack system to convert from a back-mounted position to a hip-mounted position. Still another objective of the present invention is to provide a means for attaching a snowboard or other bulky equipment to the carrier pack while in a back-mounted position for both transportation and detachment ease. Yet another objective of the present invention is to provide a carrier pack in combination with accessory safety equipment releasably mounted to the carrier pack for improving the sport experience.

To attain these objectives, the claimed invention generally comprises a bifurcated carrier pack, which pack further generally comprises a pair of storage compartments, a pair of shoulder straps, and an abdominal encircling belt. The storage compartments are designed for posterior thoracic placement when the user elects to transport equipment in the bifurcated carrier pack while in a back-mounted position. The storage compartments each further comprise means for opening and closing the storage compartment, a contact surface, a superficial surface, a superior end, a medial edge, a lateral edge, and an inferior end. The means for opening and closing the storage compartment further comprises at least one zipper mechanism, which mechanism enables the user to easily gain entrance to the storage compartments for storing of sundry equipment and further enables the user to easily reseal the storage compartments.

The bifurcated carrier pack further comprises in combination two shovel halves. The shovel halves are included in combination with the bifurcated carrier pack as essential safety tools to aid the user in the snowboarding experience and are detachably mounted to the storage compartments.

The shoulder straps each have a posterior end, an anterior end, an inner strap surface, and an exterior strap surface. The anterior ends each have fastening means for releasable attachment to the storage compartment when the user elects to transport equipment in the bifurcated carrier pack while in a hip-mounted position. The fastening means of the anterior ends further releasably attach to the abdominal encircling belt when the user elects to transport equipment in the bifurcated carrier pack while in a back-mounted position. The shoulder straps each further comprise fastening means for releasably attaching the shoulder straps to one another; the fastening means being located intermediate the anterior ends and the posterior ends. When fastened, the fastening means may better secure the storage compartments to the back of a user. This is achieved by preventing the shoulder straps from sliding from a shoulder-mounted position.

The abdominal encircling belt comprises an interior surface, an exterior surface, two anterior belt ends, and a posterior belt region intermediate the anterior belt ends. The anterior belt ends further comprise horizontal fastening means for releasable attachment to one another and vertical fastening means for releasable attachment to the anterior ends of the shoulder straps when the user elects to transport equipment in the bifurcated carrier pack while in a back-mounted position. The length of the shoulder straps may be electively adjusted to better secure the storage compartments to the back of a user. In a similar fashion, the abdominal encircling belt further comprises means for adjusting the length of the abdominal encircling belt to better secure the storage compartments to the back of a user. The posterior belt region further comprises means for pivotal attachment to the inferior end of each storage compartment thus allowing the storage compartments to rotate 360 degrees about a pivot axis of rotation adjacent the inferior ends.

The bifurcated carrier pack further comprises means for removably securing bulky equipment superjacent, or in superficial adjacency, to the superficial surfaces. The means for removably securing a snowboard further comprises at least two laterally spaced elastic straps or cords each having a superior strap end and an inferior strap end. The superior strap ends are fixedly attached adjacent the superior ends of the storage compartments. The inferior strap ends further comprise means for releasable attachment to the superficial surfaces. When the user elects to transport a snowboard in addition to stored equipment, the user releasably attaches the snowboard laterally superjacent to the superficial surfaces. Should the user elect to transport stored equipment in the bifurcated carrier pack while in a hip-mounted position, the elastic straps may preferably remain relaxably secured to the storage compartments.

BRIEF DESCRIPTION OF THE DRAWINGS

Other features of our invention will become more evident from a consideration of the following detailed description of my patent drawings, as follows:

FIG. 13(*a*) is an enlarged fragmentary cross-sectional view of the shovel halves junction of FIG. 13 to further show details of communication between the shovel halves junction.

FIG. 14 is a perspective operational view of the joined shovel halves.

DETAILED DESCRIPTION OF THE PREFERRED EMBODIMENT PREFERRED EMBODIMENT

Referring now to the drawings, the method of converting the bifurcated carrier pack 100 for electively transporting recreational equipment from a back-mounted position to a hip-mounted position is generally illustrated in FIG. 1, FIG. 2, FIG. 3, FIG. 4, FIG. 5, FIG. 6, FIG. 7 and FIG. 8. The preferred embodiment of bifurcated carrier pack 100 for electively transporting recreational equipment either in a back-mounted position or in a hip-mounted position is more generally illustrated in FIG. 9, FIG. 10, and FIG. 12. The preferred embodiment of bifurcated carrier pack 100 generally comprises a pair of storage compartments 120 as shown in FIG. 1, FIG. 2, FIG. 4, FIG. 6, FIG. 7, FIG. 8, FIG. 9 and FIG. 10; means for releasably securing the compartments, namely a pair of shoulder straps 140 as shown in FIG. 1, FIG. 3, FIG. 4, FIG. 5, FIG. 6, FIG. 7, FIG. 8, FIG. 9 and FIG. 10; and an abdominal encircling belt 160 as shown in FIG. 2, FIG. 3, FIG. 4, FIG. 5, FIG. 7, FIG. 8, FIG. 9 and FIG. 10. The preferred embodiment of bifurcated carrier pack 100 preferably further comprises in combination two shovel halves 112. Shovel halves 112 are generally illustrated in FIG. 11, FIG. 12, FIG. 13, and FIG. 14.

Storage compartments 120 are comprised of sturdy, canvas-like material so as to withstand the wear and tear of use, yet provide the user with the convenience of flexible inner compartment space. In this regard, DUPONT COR-DURA 600 DENIER brand fabric provides excellent results in terms of its durability. Further DUPONT SPANDURA brand fabric provides excellent results in terms of its tactile qualities. Storage compartments 120 can be lined with any type of durable lining material.

Figure 1:
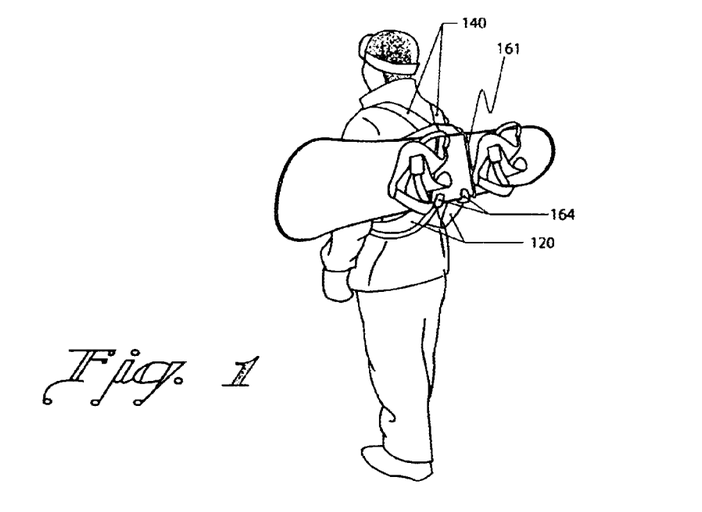
FIG. 1 is a perspective sequential view of a user wearing the bifurcated carrier pack with snowboard attached.
Figure 2:
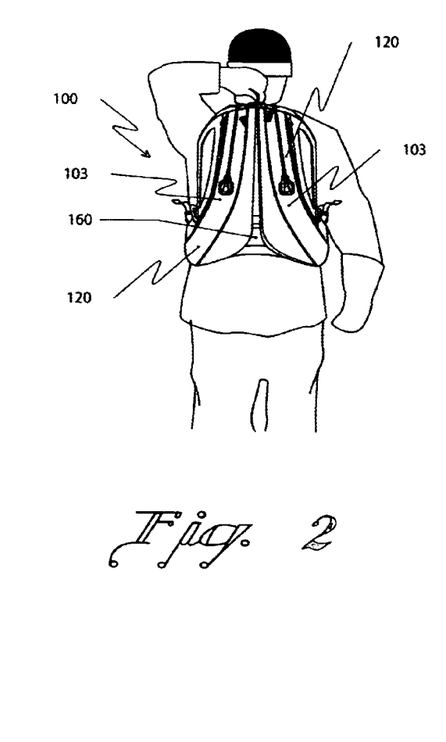
FIG. 2 is a back sequential view of a user wearing the bifurcated carrier pack in a first stage of conversion from a back-mounted position to a hip-mounted position.
Figure 7:
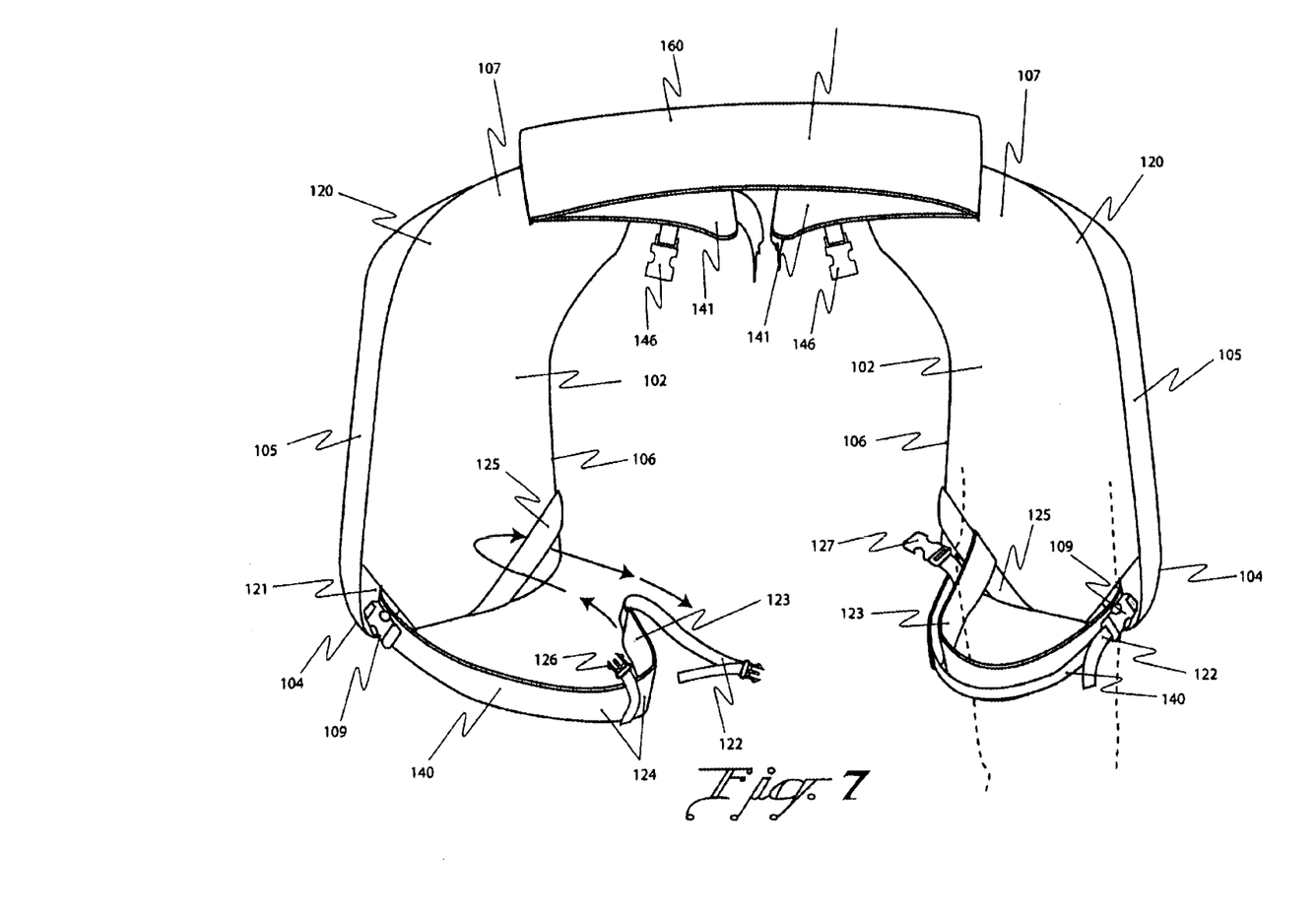
FIG. 7 is a fragmentary front plan view of the bifurcated carrier pack in a hip-mounted position showing one leg of a user in broken lines.

Storage compartments 120 are designed for posterior thoracic placement when the user elects to transport equipment in bifurcated carrier pack 100 while in a back-mounted position as shown in FIG. 1 and FIG. 2. Storage compartments 120 further comprise means for opening and closing the storage compartment, a contact surface 102 adjacent the user's back when in a back-mounted position as shown in FIG. 7 and FIG. 10; a superficial surface 103 as shown in FIG. 2, FIG. 4, FIG. 8 and FIG. 9; a superior end 104 as shown in FIG. 4, FIG. 7, FIG. 9 and FIG. 10; a medial edge 105 as shown in FIG. 4, FIG. 7, FIG. 9 and FIG. 10; a lateral edge 106 as shown in FIG. 4, FIG. 7, FIG. 8, FIG. 9 and FIG. 10; and an inferior end 107 as shown in FIG. 4, FIG. 7, FIG. 9 and FIG. 10.

Figure 9:
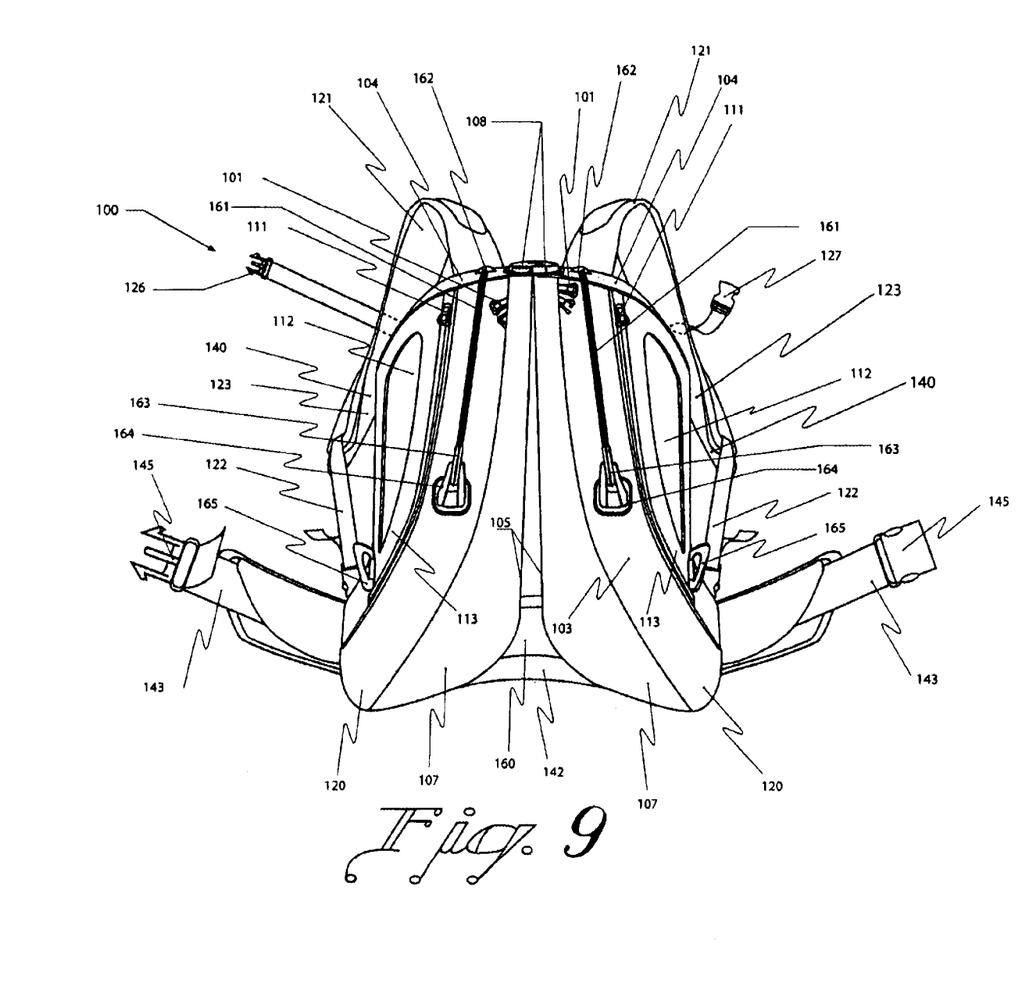
FIG. 9 is a back plan view of the bifurcated carrier pack.
Figure 10:
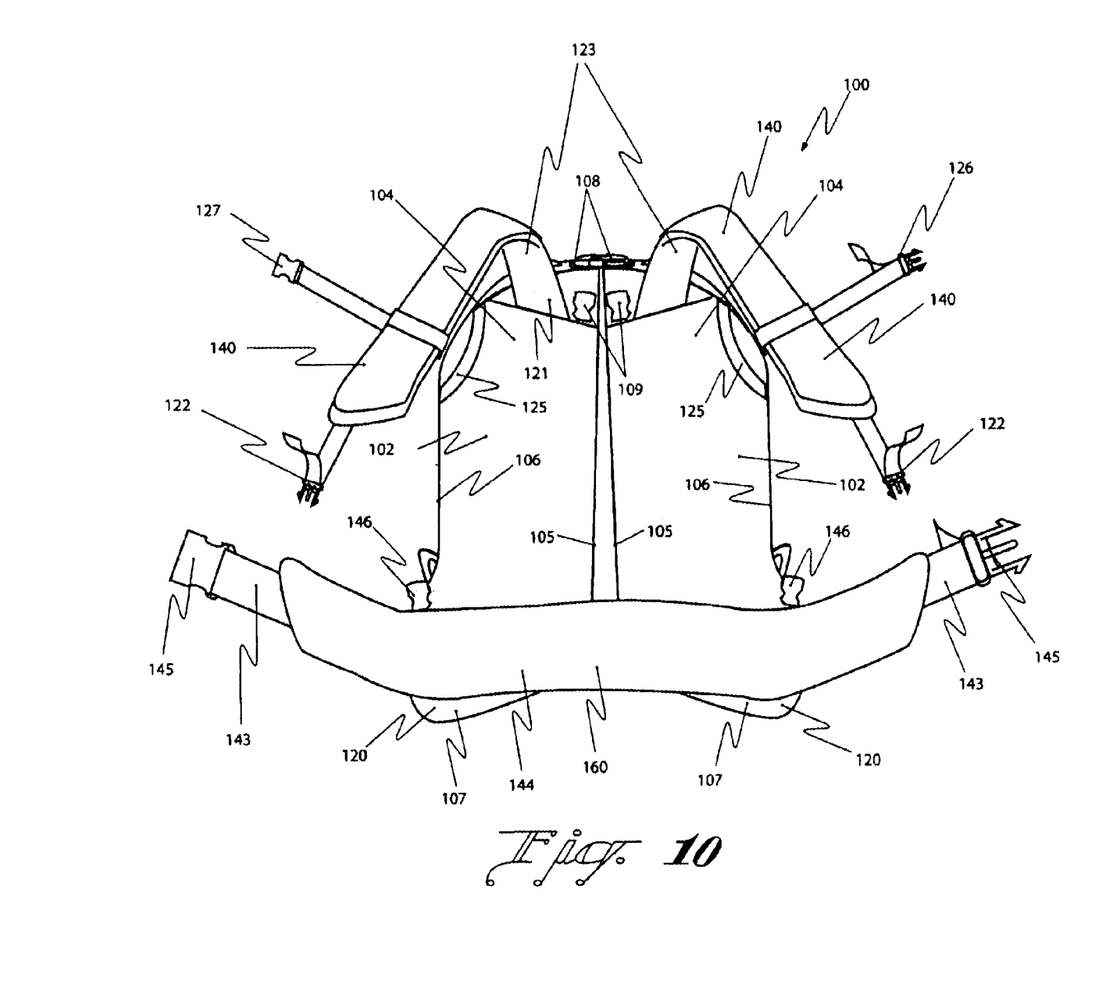
FIG. 10 is a front plan view of the bifurcated carrier pack.
Figure 11:
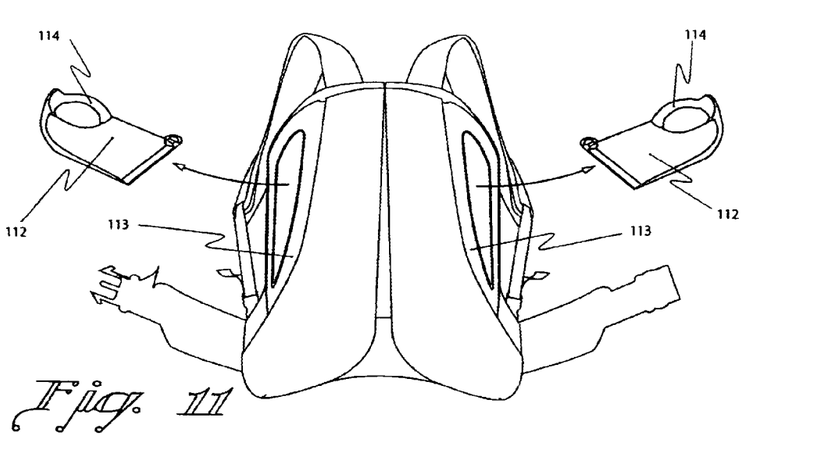
FIG. 11 is a back plan view of the bifurcated carrier pack in broken lines to emphasize placement of accessory shovel halves in combination with the bifurcated carrier pack.

The means for opening and closing each storage compartment 120 further comprises at least one zipper mechanism 101 as shown in FIG. 9, which zipper mechanism 101 enables the user to easily gain entrance to storage compartments 120 for storing of sundry equipment and further enables the user to easily reseal storage compartments 120. In the preferred embodiment, storage compartments 120 may include additional sub-compartments for compartmentalizing sundry equipment. The preferred means for opening and closing any additional sub-compartments comprises corresponding additional zipper mechanisms.

Storage compartments 120 each preferably further comprise an expansion pocket and an expansion zipper 111 as are shown in FIG. 9. The expansion pockets are preferably stitched or sewn in deep relation to expansion zippers 111. Expansion zippers 111 and the corresponding expansion pockets thus enable the user to increase the volume capacity of storage compartments 120 when expansion zippers 111 are electively unzipped. This is achieved by electively unzipping expansion zippers 111 and expanding the expansion pockets until the material comprising the pocket becomes taut.

Superior ends 104 comprise superior fastening means 108 for releasable attachment to one another. Superior fastening means 108 are further defined in the preferred embodiment by comprising male and female fastening clasps. The male and female fastening clasps should be of sort easily released and easily engaged, yet be sturdy to withstand wear and tear of use, preferably of the type having side release buckles, which have an additional through-going strap adjustability feature. Superior fastening means 108 should be fixedly attached to storage compartments 120 such that when the user elects to transport stored equipment in bifurcated carrier pack 100 while in a back-mounted position, superior fastening means 108 may fasten storage compartments 120 such that medial edges 105 are positioned in snug adjacency relative to each other. Further, medial edges 105 are designed to lie in superficial adjacency to the medial line of a human back when the user elects to transport equipment in bifurcated carrier pack 100 while in a back-mounted position. Further, superior fastening means 108 should be fixedly attached at the superior most edge of superior ends 104 so as to better enable the user to easily release and engage superior fastening means 108 while bifurcated carrier pack 100 is in a back-mounted position as is generally illustrated in FIG. 2.

Inferior ends 107 each preferably have means for adjustable affixation or preferably pivotal attachment to abdominal encircling belt 160. The means for pivotal attachment to abdominal encircling belt 160 further preferably comprise large rivets that pierce the fabric of storage compartments 120 and abdominal encircling belt 160 at the pivot attachment point, thus allowing each storage compartment 120 to pivot about a rivet enabling the user to pivot storage compartments 120 into either a back-mounted configuration or a hip-mounted configuration.

Figures 4, 5, 6:
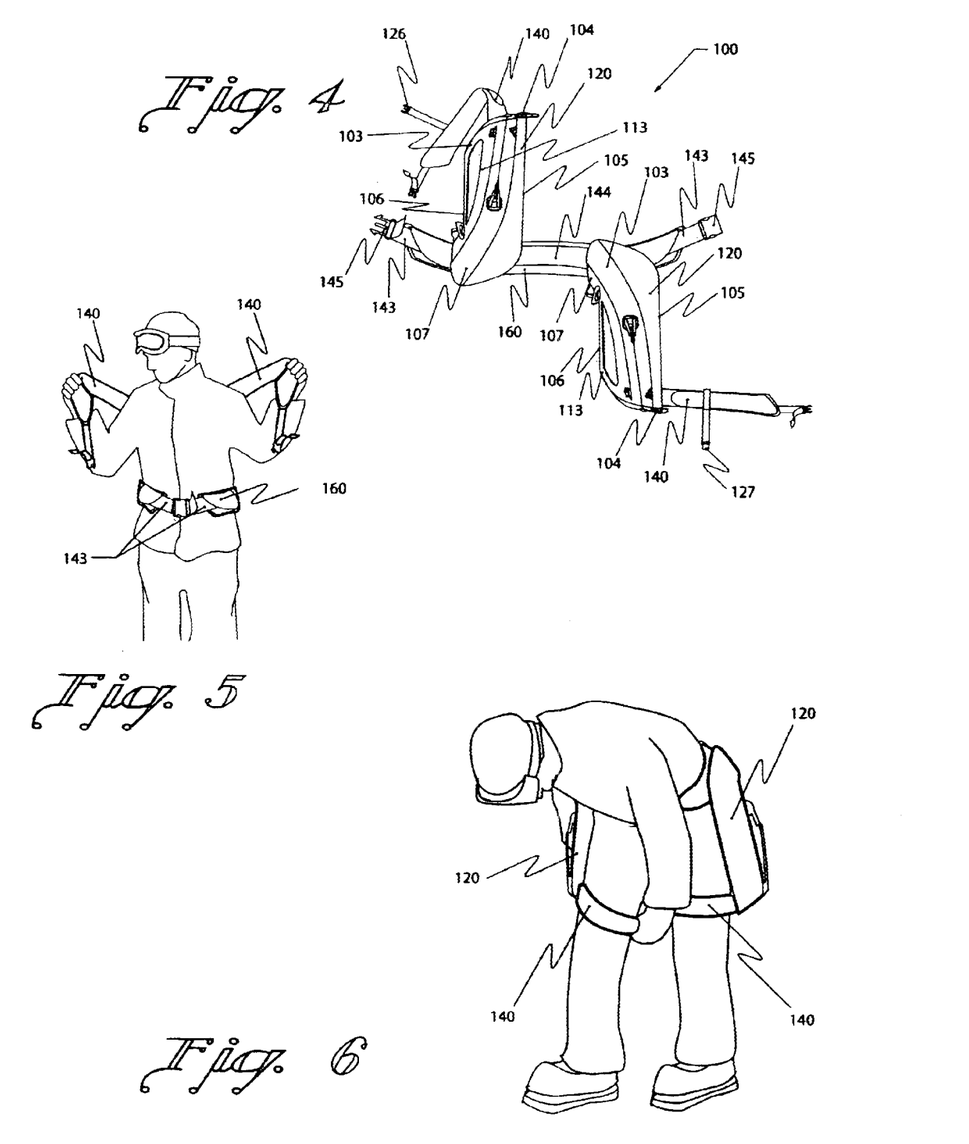
FIG. 4 is a back plan view of the bifurcated carrier pack showing the storage compartments in a pivoted state.
FIG. 5 is a front sequential view of a user wearing the bifurcated carrier pack in a third stage of conversion from a back-mounted position to a hip-mounted position.
FIG. 6 is a front sequential view of a user wearing the bifurcated carrier pack in a fourth stage of conversion from a back-mounted position to a hip-mounted position.

Bifurcated carrier pack 100 further comprises means for removably securing a snowboard transversely in superficial adjacency to storage compartments 120 or other bulky equipment having dimensions larger than the interior compartment space of either storage compartment 120 superjacent, or in superficial adjacency, to superficial surfaces 103. The means for removably securing a snowboard further comprises at least two laterally spaced elastic cords or elastic straps 161, elastic straps 161 each having a superior strap end 162 and an inferior strap end 163 as shown in FIG. 9. Superior strap ends 162 are fixedly attached adjacent superior ends 104. Inferior strap ends 163 further comprise means for releasable attachment to superficial surfaces 103. Inferior strap ends 163 preferably comprise hook-like structures. In this regard, superficial surfaces 103 each further preferably comprise one pair of loop-like structures, namely, a medial support loop 164 as shown in FIG. 1, FIG. 2, FIG. 4 and FIG. 9; and a lateral securement loop 165 as shown in FIG. 9. Each medial support loop 164 is fixedly positioned medially and superior to lateral securement loop 165 as shown in FIG. 9. Medial support loops 164 further comprises a support portion and a loop portion. Lateral securement loops 165 primarily comprise a loop portion. When the user elects to transport a snowboard in addition to accessory equipment, the user may place the snowboard on medial support loops 164 laterally superjacent, or in superficial adjacency, to superficial surfaces 103 on the support portions as shown in FIG. 1. Elastic straps 161 are then extended in superficial adjacency to the snowboard, coming in contact therewith, and inferior strap ends 163 are hooked through lateral securement loops 165 thus securing the snowboard in position as is further shown in FIG. 1. When the user elects to transport stored equipment in bifurcated carrier pack 100 while in a back-mounted position, the user may detach the snowboard by unhooking inferior strap ends 163 and removing the snowboard. In such case, the user may hook inferior strap ends 163 through the loop portion of medial support loops 164 thus conveniently stowing elastic straps 161 in a relaxed state as is shown in FIG. 9. Should the user elect to transport stored equipment in bifurcated carrier pack 100 while in a hip-mounted position, elastic straps 161 may preferably remain secured to medial support loops 164 as depicted in FIG. 4.

Figure 8:
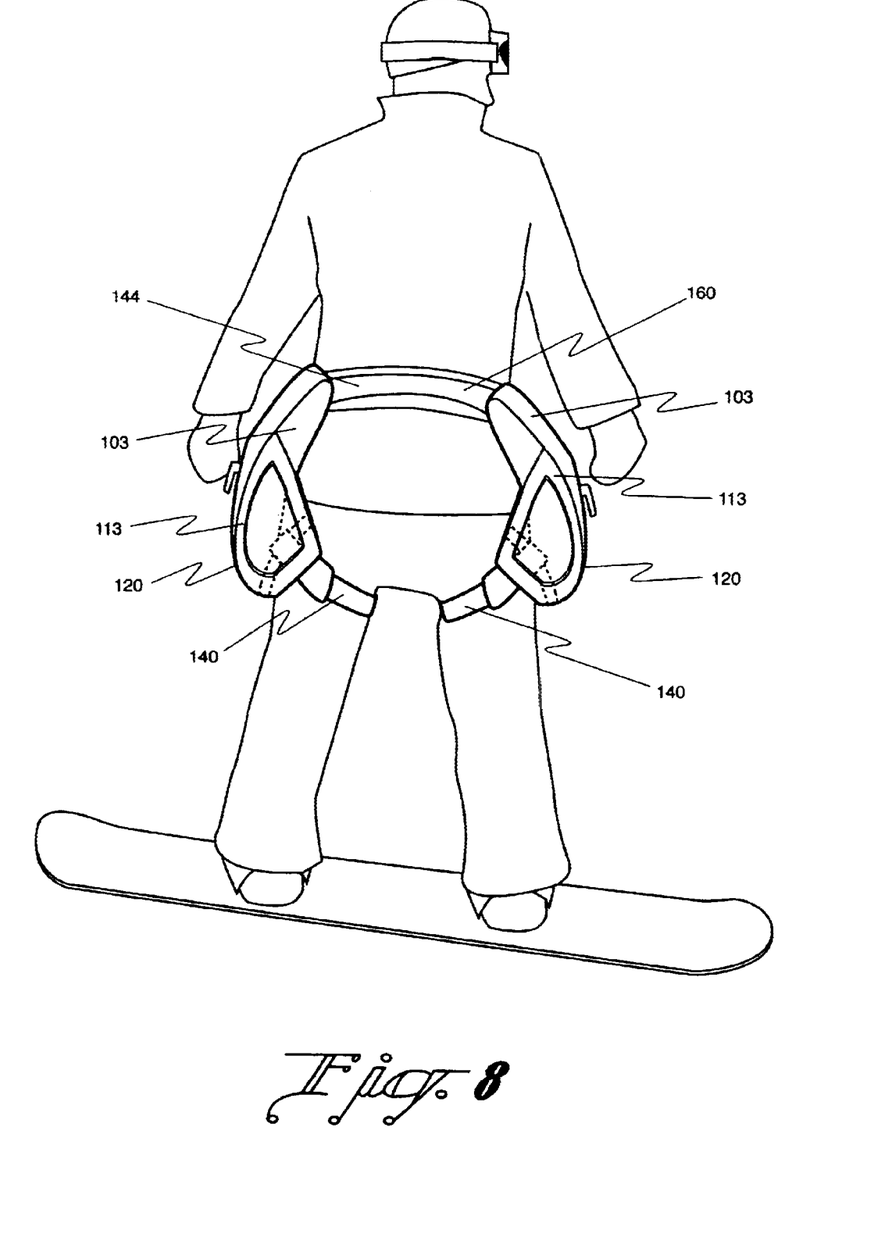
FIG. 8 is a back sequential view of a user wearing the bifurcated carrier pack converted from a back-mounted position to a hip-mounted position with parts broken away to show details of hip-mounted securement.

Storage compartments 120 each preferably further comprise means for removably securing accessory equipment or, preferably, a shovel half 112 to the respective storage compartment. In this regard, the means for removably securing each shovel half 112 further preferably comprises a superficial surface lip 113 attached to each superficial surface 103 intermediate medial support loops 164 and lateral securement loops 165 as shown in FIG. 4, FIG. 8, FIG. 9., and FIG. 11. Superficial surface lips 113 preferably comprise elastic material sized and shaped to snugly receive shovel halves 112. When the user elects to transport shovel halves 112, the user may stretch superficial surface lips 113 and insert corresponding shovel halves 112 in deep relation to superficial surface lips 113. The elasticity of superficial surface lips 113 thus secures shovel halves 112 in superficial adjacency to superficial surfaces 103 by securing shovel halves 112 about the perimeter of each shovel half 112 as shown in FIG. 9. When the user elects to utilize shovel halves 112, the user may stretch superficial surface lips 113 and remove shovel halves 112 in a reverse fashion.

Bifurcated carrier pack 100 preferably further comprises in combination removably secured accessory equipment or, preferably, two shovel halves 112. Shovel halves 112 are preferably included in combination with bifurcated carrier pack 100 as essential tools to aid the user in the snowboarding experience. For example, snowboard enthusiasts often test the snow pack at the situs of activity before engaging in snowboard activity. A shovel is thus an essential tool to test snow pack.

Figure 12:
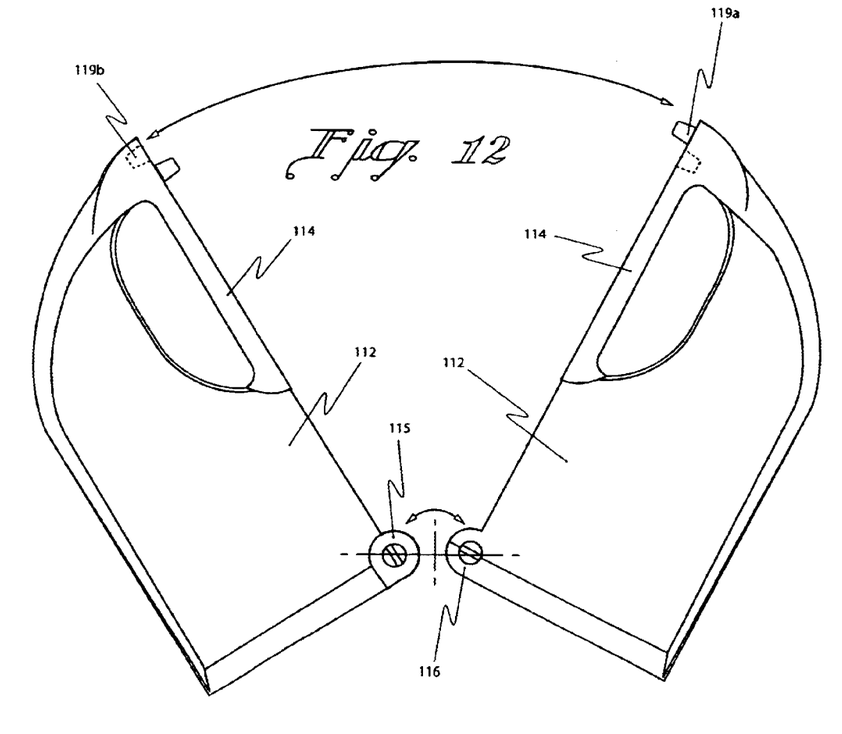
FIG. 12 is a top plan view of the shovel halves.
Figure 13:
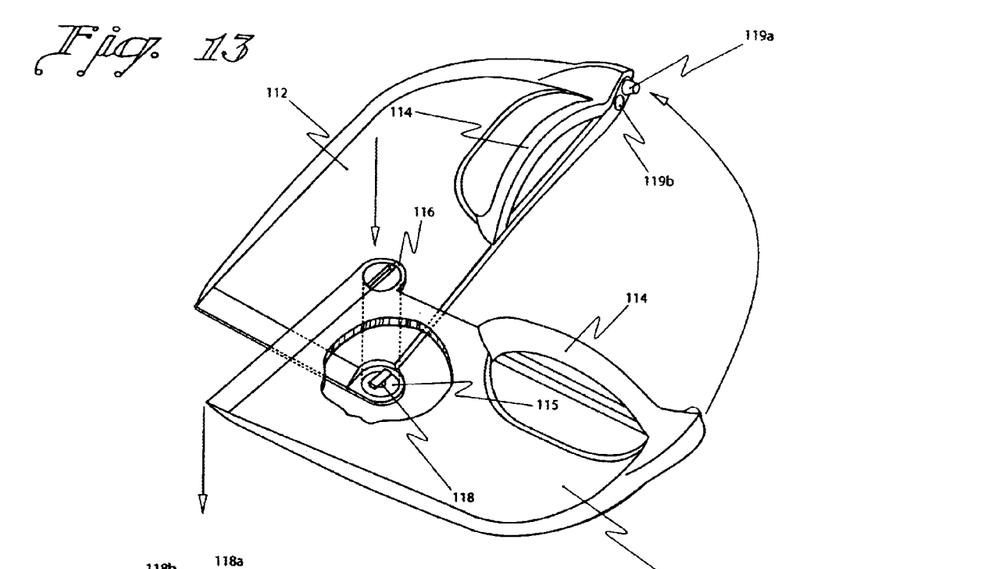
FIG. 13 is a perspective view of the shovel halves with parts broken away to show the shovel halves junction.
Figures 13A, 14:
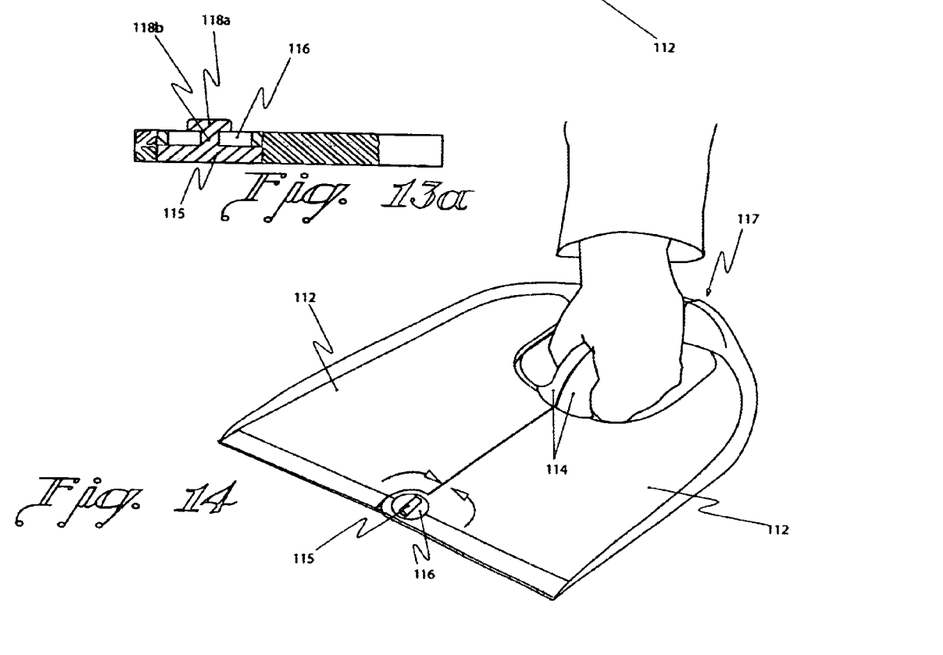

Shovel halves 112 each further comprise a handle portion 114 and a junction portion as shown in FIG. 11, FIG. 12, FIG. 13 and FIG. 14. The junction portion of one shovel half 112 comprises a male junction 115 and the junction portion of the other shovel half 112 comprises a female junction 116 as shown in FIG. 12, FIG. 13, FIG. 13(*a*), and FIG. 14. Shovel halves 112 are connected into a shovel 117 as shown in FIG. 14 by placing female junction 116 over male junction 115 such that female junction 116 seats on male junction 115 as shown in FIG. 13 and FIG. 13(*a*).

Male junction 115 further comprises means for securing female junction 116 in cooperative association with male junction 115. Preferably, the means for securing female junction 116 in cooperative association with male junction 115 further comprises a fixed T-shaped locking structure 118 as shown in FIG. 13 and FIG. 13(*a*). T-shaped locking structure 118 further comprises a head portion 118*a* and a trunk portion 118*b*. Head portion 118*a* is shaped so as to be readily received by female junction 116 when female junction 116 is seated on male junction 115. When female junction 116 is seated on male junction 115, trunk portion 118*b* has sufficient length such that female junction 116 may pass underneath head portion 118*a*. To form shovel 117, shovel halves 112 are rotated about a pivot axis of rotation extending through the junction portions, female junction 116 sliding underneath head portion 118*a* and head portion 118*a* thus locking female junction 116 in seated relation atop male junction 115. Male junction 115 and female junction 116 are preferably made of stainless steel to provide a more stable junction and to avoid rusting.

Shovel halves 112 may further comprise additional means for securing shovel halves 112 to one another, the means for securing shovel halves 112 being located adjacent handle portions 114. The means for securing shovel halves 112 to one another preferably further comprise male peg structure 119*a* and female peg receiving structure 119*b* as shown in FIG. 12 and FIG. 13. When shovel halves 112 are rotated about a pivot axis of rotation extending through the junction portions to form shovel 117, male peg structure 119*a* and female peg receiving structure 119*b* thus cooperatively operate to further secure shovel halves 112 to one another as shown in FIG. 12, FIG. 13 and FIG. 14. Shovel halves 112 are preferably made of injection molded plastic. Further, handle portions 114 are preferably covered with a rubber overmold.

Shoulder straps 140 each have a posterior end 121 preferably comprised in part of ¼ inch closed cell foam padding as shown in FIG. 7, FIG. 9 and FIG. 10; an anterior end 122 preferably comprised of injection molded nylon as shown in FIG. 7, FIG. 9 and FIG. 10; an inner strap surface 123 as shown in FIG. 7, FIG. 9 and FIG. 10; and an exterior strap surface 124 as shown in FIG. 7 and FIG. 10.

Superior ends 104 each further comprise inferior fastening means 109 for releasable attachment to anterior ends 122 when the user elects to transport equipment in bifurcated carrier pack 100 while in a hip-mounted position as is shown in FIG. 7 and FIG. 10. Anterior ends 122 each have fastening means for releasable attachment to corresponding inferior fastening means 109 when the user elects to transport equipment in bifurcated carrier pack 100 while in a hip-mounted position as shown in FIG. 7. Fastening means of anterior ends 122 further releasably attach to abdominal encircling belt 160 when the user elects to transport equipment in bifurcated carrier pack 100 while in a back-mounted position as shown in FIG. 3.

Shoulder straps 140 each further comprise fastening means for releasably attaching shoulder straps 140 to one another; the fastening means being located intermediate anterior ends 122 and posterior ends 121. The fastening means preferably further comprise a male clasp 126 and a female clasp 127 as shown in FIG. 4, FIG. 7, FIG. 9 and FIG. 10. Male clasp 126 and female clasp 127 should be of sort easily released and easily engaged, yet be sturdy to withstand wear and tear of use, preferably of the type having side release buckles, which have an additional through-going strap adjustability feature. Male clasp 126 and female clasp 127, when fastened, better secure storage compartments 120 to the back of a user, when the user elects to transport stored equipment in bifurcated carrier pack 100 while in a back-mounted position. This is achieved by preventing shoulder straps 140 from sliding from a shoulder-mounted position as shown in FIG. 3.

Posterior ends 121 are preferably pivotally attached to storage compartments 120 adjacent superior ends 104 as shown in FIG. 7, FIG. 9 and FIG. 10. The pivotal attachment point to each storage compartment 120 is preferably achieved by using rivets that pierce the fabric of storage compartments 120 and posterior ends 121 at the pivot attachment point, thus allowing each shoulder strap 140 to pivot about a rivet enabling the user to pivot shoulder straps 140 for use either in a back-mounted configuration or a hip-mounted configuration.

Figure 3:
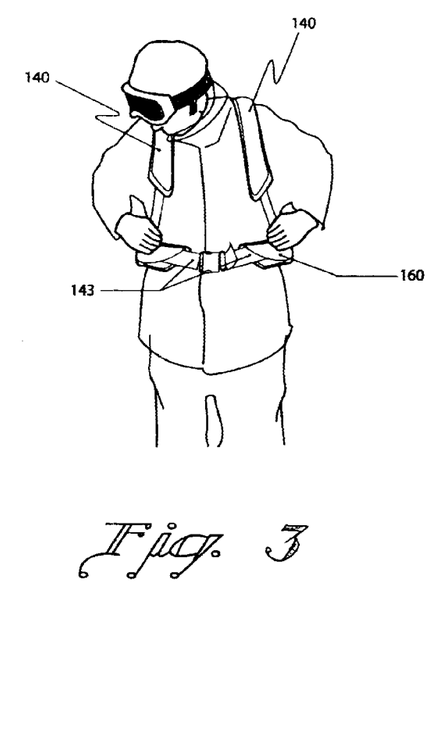
FIG. 3 is a front sequential view of a user wearing the bifurcated carrier pack in a second stage of conversion from a back-mounted position to a hip-mounted position.

When superior fastening means 108, male clasp 126 and a female clasp 127, and anterior ends 122 are electively released as is shown in FIG. 2 and FIG. 3., each storage compartment 120 may be rotated about a pivot axis of rotation adjacent its respective inferior end 107 to put storage compartments 120 in position for securement to the hips of a user when the user elect to transport equipment in bifurcated carrier pack 100 while in a hip-mounted position as is shown in FIG. 4, FIG. 5 and FIG. 6.

As indicated, superior ends 104 each further comprise inferior fastening means 109 for releasable attachment to anterior ends 122 when the user elects to transport equipment in bifurcated carrier pack 100 while in a hip-mounted position as is shown in FIG. 7. Shoulder straps 140 may then electively be pivoted about a pivot axis of rotation at superior end 104 to better enable the user to secure shoulder straps 140 around the legs of a user for securement of storage compartments 120 to the hips of user when the user elects to transport equipment in bifurcated carrier pack 100 while in a hip-mounted position. When the user elects to configure bifurcated carrier pack 100 in the hip-mounted position, each shoulder strap 140 is electively pivoted, wrapped once around the corresponding leg of a user, fed through a webbing loop 125, and doubled back around the leg of the user as shown in FIG. 6 and FIG. 7. Webbing loops 125 are preferably located adjacent corresponding lateral edges 106 as shown in FIG. 10.

Shoulder straps 140 are preferably of sufficient length to twice encircle a portion of a user's leg to adequately secure storage compartments 120 to the hips of a user. Shoulder straps 140 are further preferably adjustable in length having means for adjusting shoulder strap length intermediate posterior ends 121 and anterior ends 122, but preferably at the situs of the fastening means. The fastening means preferably comprises male and female fastening clasps easily released and easily engaged of the type having side release buckles, which have an additional through-going strap adjustability feature. Further, exterior strap surfaces 124 may further comprise VELCRO brand hook and loop fastening means for reinforced releasable securement when shoulder straps 140 are doubled back around the legs of a user and anterior ends 122 are fastened to inferior fastening means 109 as shown in FIG. 7.

Abdominal encircling belt 160 has an interior surface 141 as shown in FIG. 7 and FIG. 10; an exterior surface 142 as shown in FIG. 7 and FIG. 9; two anterior belt ends 143 preferably comprised of injection molded nylon as shown in FIG. 3, FIG. 4, FIG. 5, FIG. 9 and FIG. 10; and a posterior belt region 144 preferably comprised in part of ¼ inch closed cell foam padding intermediate anterior belt ends 143 as shown in FIG. 4, FIG. 8 and FIG. 10. Anterior belt ends 143 further comprise horizontal fastening means 145 for releasable attachment to each other as shown in FIG. 4, FIG. 9 and FIG. 10. Anterior belt ends 143 further comprise vertical fastening means 146 as shown in FIG. 7 and FIG. 10 for releasable attachment to anterior ends 122 when the user elects to transport equipment in bifurcated carrier pack 100 while in a back-mounted position as operatively shown in FIG. 3. The length of shoulder straps 140 may be electively adjusted to better secure storage compartments 120 to the back of a user. In a similar fashion, abdominal encircling belt 160 further comprises means for adjusting the length of abdominal encircling belt 160 to better secure storage compartments 120 to the back of a user. The means for adjusting the length preferably comprise horizontal fastening means 145 of the type having side release buckles, which have an additional through-going strap adjustability feature.

Posterior belt region 144 further preferably has means for pivotal attachment to each inferior end 107 thus allowing the storage compartments 120 to rotate 360 degrees about a pivot axis of rotation adjacent inferior ends 107. The means for pivotal attachment to abdominal encircling belt 160 further preferably comprise large rivets that pierce the fabric of storage compartments 120 and abdominal encircling belt 160 at the pivot attachment point. This allows each storage compartment 120 to pivot about a rivet enabling the user to pivot storage compartments 120 into either a back-mounted configuration or a hip-mounted configuration.

Lateral edges 106 each preferably have contoured surfaces for nested engagement about the hips of a user when a user desires to disengage superior fastening means 108 enabling each storage compartment 120 to pivot about the pivot axes of rotation adjacent inferior ends 107. As indicated, anterior ends 122 releasably attach to inferior fastening means 109 for circumferentially securing shoulder straps 140 about the legs of a user, thus securing lateral edges 106 in nested engagement about the hips of a user when in a hip-mounted position. Furthermore, as indicated, vertical fastening means 146 for releasable attachment are releasably attached to anterior ends 122 when the user elects to transport equipment in bifurcated carrier pack 100 while in a back-mounted position, thus holding storage compartments 120 in posterior thoracic placement.

The reader will thus see that the present invention discloses a two-compartment system whereby a user may elect to transport equipment either in a traditional rucksack, back-mounted manner or in an unconventional, hip-mounted manner. In this regard, the reader will further see that the present invention discloses a bifurcated carrier pack for electively transporting various types of equipment either in a back-mounted position or in a hip-mounted position. The reader will further see that the present invention discloses a two-compartment carrier pack system, which, at the election of the user, enables the user to shift his or her center of gravity from a superior center to an inferior center for improving the sport experience. The reader will yet further see that the present invention discloses a two-compartment carrier pack system, wherein the compartments pivot about an abdominal encircling belt to convert from a traditional back-mounted position to a hip-mounted position. The reader will still further see that the present invention discloses a means for attaching a snowboard or other bulky equipment to the bifurcated carrier pack while in a back-mounted position for both transportation and detachment ease. The reader will still further see that the present invention also discloses a bifurcated carrier pack in combination with accessory safety equipment releasably mounted to the carrier pack for improving the sport experience.

It is contemplated that the concepts herein described may be extended and applied to bifurcated carrier packs of the type herein described to any appropriate sporting activity requiring human transportation of equipment. The bifurcated carrier pack herein illustrated and described is used primarily for descriptive and illustrative purposes and should not be construed to limit the scope of concept application to the application as shown. Accordingly, although the invention has been described by reference to a preferred embodiment, it is not intended that the novel device be limited thereby, but that modifications thereof are intended to be included as falling within the broad scope and spirit of the foregoing disclosure, the following claims and the appended drawings.

I claim:

1. A bifurcated carrier pack for electively transporting recreational equipment in a back-mounted position or in a hip-mounted position, the bifurcated carrier pack comprising:

at least one left storage compartment and at least one right storage compartment, each storage compartment having means for opening and closing the storage compartment, a contact surface, a superficial surface, a superior end, a medial edge, a lateral edge, and an inferior end, the superior ends having superior fastening means for releasable attachment to one another, the superior ends further comprising inferior fastening means for releasable attachment to a left shoulder strap and a right shoulder strap when the user elects a hip-mounted position, the inferior ends having means for pivotal attachment to an abdominal encircling belt, the storage compartments being designed for posterior thoracic placement when the user elects a back-mounted position, the medial edges of the storage compartments being positioned in snug adjacency to each other in superficial adjacency to the medial line of a human back when in a back-mounted position;

the left shoulder strap and the right shoulder strap each having a posterior end, an anterior end, an inner strap surface, and an exterior strap surface, the posterior ends being pivotally attached adjacent the superior ends, the anterior ends having fastening means for releasable attachment to the inferior fastening means when the user elects a hip-mounted position; and the abdominal encircling belt having an interior surface, an exterior surface, two anterior belt ends, and a posterior belt region intermediate the two anterior belt ends, the anterior belt ends having horizontal fastening means for releasable attachment to one another and vertical fastening means for releasable attachment to the anterior ends when the user elects a back-mounted position, the posterior belt region having means for pivotal attachment to the inferior ends, the means for pivotal attachment being pivotally attached to the inferior ends allowing the each storage compartment to rotate about a pivot axis of rotation, the vertical means for releasable attachment being releasably attached to the anterior ends, thus holding each storage compartment in posterior thoracic placement when the user elects a back-mounted position, the lateral edges each having contoured surfaces for nested engagement about the hips of a user when a user desires to disengage the superior fastening means enabling each storage compartment to pivot about the pivot axes of rotation, the anterior ends being releasably attached to the inferior fastening means for circumferentially securing the shoulder straps about the legs of a user thus securing the lateral edges in nested engagement about the hips of a user when the user elects a hip-mounted position.

2. The bifurcated carrier pack of claim 1 wherein the bifurcated carrier pack further comprises means for removably securing a snowboard in superficial adjacency to the superficial surfaces, the means for securing a snowboard further comprising:

at least two laterally spaced elastic straps, the elastic straps each having a superior strap end and an inferior strap end, the superior strap ends being fixedly attached adjacent the superior ends, the inferior strap ends having means for releasable attachment to the superficial surfaces, the elasticity of the elastic straps enabling a user to insert a snowboard in superficial adjacency to the superficial surfaces; and means for releasable attachment to the inferior strap ends, the inferior strap ends being electively attached to the means for releasable attachment enabling the user to electively secure a snowboard in superficial adjacency to the superficial surfaces.

3. The bifurcated carrier pack of claim 2 wherein the shoulder straps each further comprise fastening means for releasably attaching the shoulder straps to one another, the fastening means being located intermediate the anterior ends and the posterior ends.

4. The bifurcated carrier pack of claim 2 wherein the means for opening and closing each storage compartment further comprises at least one zipper.

5. The bifurcated carrier pack of claim 4 wherein each storage compartment further comprises an expansion pocket and an expansion zipper, the expansion zippers enabling the user to increase the volume capacity of the storage compartments when electively unzipped.

6. The bifurcated carrier pack of claim 5 wherein each storage compartment further comprises means for removably securing a shovel half to the storage compartment.

7. The bifurcated carrier pack of claim 6 wherein the pack further comprises in combination a left shovel half for securement to the left storage compartment and a right shovel half for securement to the right storage compartment, the left and right shovel halves having means for cooperative attachment to one another.

8. The bifurcated carrier pack of claim 2, wherein each superior end further comprises a webbing loop adjacent the lateral edge, the shoulder straps having sufficient adjustable length to twice encircle a human leg, the shoulder straps being first wrapped once around a user's legs, fed through the webbing loops and doubled-back around the user's legs, the anterior ends being releasably attached to the inferior fastening means for greater fastening securement of the storage compartments when the user elects the hip-mounted position.

9. The bifurcated carrier pack of claim 8, wherein each exterior strap surface further comprises hook and loop fastening means for greater fastening securement of the storage compartments when the user elects the hip-mounted position.

10. A bifurcated carrier pack for electively transporting recreational equipment in a back-mounted position or in a hip-mounted position, the bifurcated carrier pack comprising:
   a pair of storage compartments, the compartments each having a superior end, an inferior end, a medial exterior surface, a lateral exterior surface, and means for opening and closing the compartment, each inferior end having means for adjustable affixation to an abdominal encircling belt, each compartment being adjustable about a point of adjustable affixation adjacent its inferior end, the medial exterior surfaces being in nested engagement with one another when the user elects to carry the pack in the back-mounted position, the lateral exterior surfaces being in nested engagement about the hips of a user when a user elects to disengage the pack from the back-mounted position and adjust each compartment about the point of adjustable affixation adjacent its inferior end into the hip-mounted position;
   a pair of shoulder straps, the straps each having a posterior end, an anterior end, an inner strap surface, and an exterior strap surface, the posterior ends being adjustably attached to the compartments adjacent the superior ends, the anterior ends having means for releasably securing the compartments on the back of a user when the user elects to carry the pack in the back-mounted position, the means further releasably securing the lateral exterior surfaces in nested engagement about the hips of a user when the user elects to carry the pack is in the hip-mounted position;
   the abdominal encircling belt having means for adjustably affixing each inferior end, each inferior end being adjustably affixed to the abdominal encircling belt thus enabling the user to adjust each compartment for electively transporting stored equipment in the back-mounted position or in the hip-mounted position; and
   means for removably securing bulky equipment to the exterior surfaces of the compartments.

11. The bifurcated carrier pack of claim 10 wherein the means for opening and closing each compartment further comprises at least one zipper.

12. The bifurcated carrier pack of claim 11 wherein the compartments each further comprise an expansion pocket and an expansion zipper enabling the user to increase the volume capacity of the compartments when electively unzipped.

13. The bifurcated carrier pack of claim 12 wherein the compartments each further comprise means for removably securing at least one accessory item to the compartment.

14. The bifurcated carrier pack of claim 13 wherein the pack further comprises in combination removably secured accessory items.

15. A bifurcated carrier pack for electively transporting equipment in a back-mounted position or in a hip-mounted position, the bifurcated carrier pack comprising:
   a pair of storage compartments, the compartments each having a superior end, an inferior end, a medial exterior surface, a lateral exterior surface, and means for opening and closing the compartment, each inferior end having means for adjustable affixation to an abdominal encircling belt, each compartment being adjustable about a point of adjustable affixation adjacent its inferior end, the medial exterior surfaces being in nested engagement with one another when the user elects to carry the pack in the back-mounted position, the lateral exterior surfaces being in nested engagement about the hips of a user when a user elects to disengage the pack from the back-mounted position and adjust each compartment about the point of adjustable affixation adjacent its inferior end into the hip-mounted position;
   means for releasably securing the compartments on the back of a user when the user elects to carry the pack in the back-mounted position, the means further releasably securing the lateral surfaces in nested engagement about the hips of a user when the user elects to carry the pack is in the hip-mounted position; and
   the abdominal encircling belt having means for adjustably affixing each inferior end, each inferior end being adjustably affixed to the abdominal encircling belt enabling the user to adjust each compartment for electively transporting stored equipment in the back-mounted position or in the hip-mounted position.

16. The bifurcated carrier pack of claim 15 wherein the bifurcated carrier pack further comprises means for removably securing bulky equipment to the exterior surfaces of the compartments.

17. The bifurcated carrier pack of claim 16 wherein the bifurcated carrier pack further comprises means for removably securing a snowboard to the exterior surfaces of the compartments.

18. The bifurcated carrier pack of claim 15 wherein the means for opening and closing each compartment further comprises at least one zipper.

19. The bifurcated carrier pack of claim 18 wherein the compartments each further comprise an expansion pocket and an expansion zipper enabling the user to increase the volume capacity of the compartments when electively unzipped.

20. The bifurcated carrier pack of claim 15 wherein the compartments each further comprise means for removably securing accessory equipment to the compartment.

21. The bifurcated carrier pack of claim 20 wherein the pack further comprises in combination removably secured accessory equipment.

22. The bifurcated carrier pack of claim 16 wherein the pack further comprises in combination removably secured bulky equipment, the bulky equipment lying in superficial adjacency to the exterior surfaces of the compartments.

23. The bifurcated carrier pack of claim 17 wherein the pack further comprises in combination a removably secured snowboard, the snowboard extending transversely in superficial adjacency to the exterior surfaces of the compartments.

* * * * *